W. E. MERRITT.
VALVE.
APPLICATION FILED OCT. 23, 1913. RENEWED APR. 6, 1915.
1,142,723.
Patented June 8, 1915.
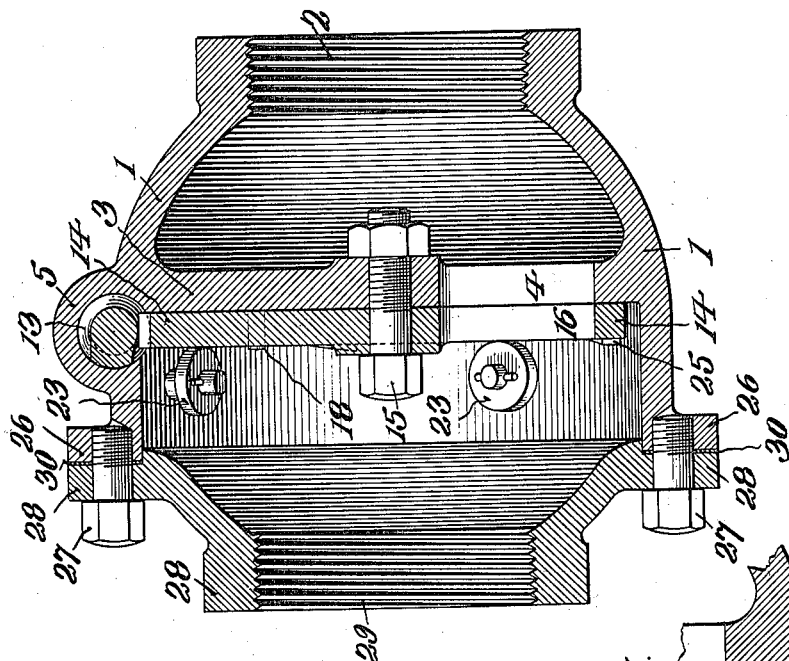
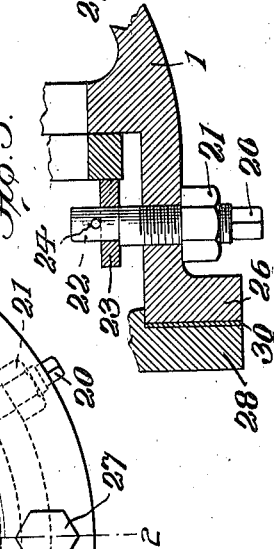
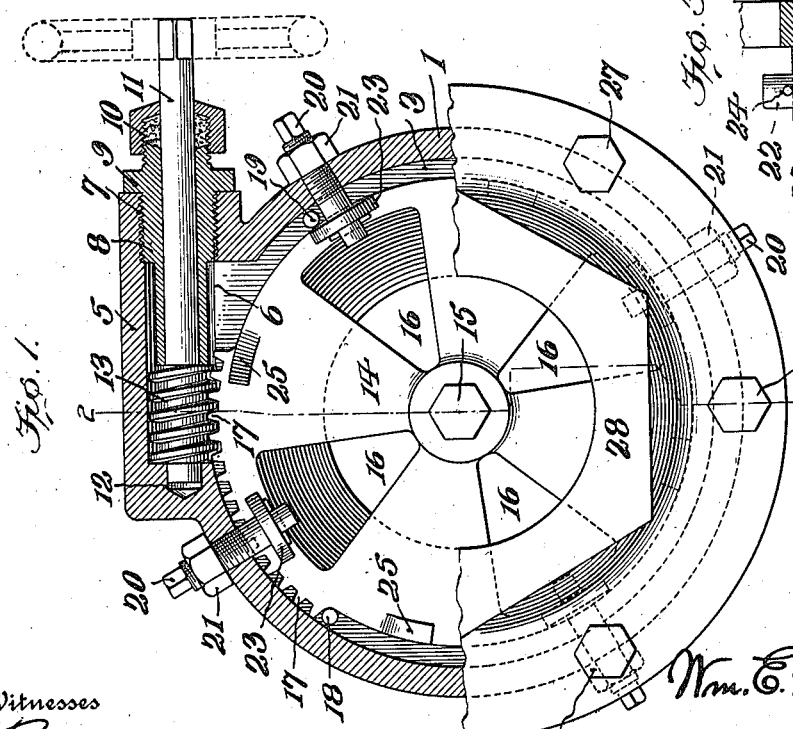

UNITED STATES PATENT OFFICE.

WILLIAM E. MERRITT, OF PORTLAND, OREGON.

VALVE.

1,142,723.  Specification of Letters Patent.  Patented June 8, 1915.

Application filed October 23, 1913, Serial No. 796,948. Renewed April 6, 1915. Serial No. 19,556.

*To all whom it may concern:*

Be it known that I, WILLIAM E. MERRITT, a citizen of the United States, residing at Portland, in the county of Multnomah and State of Oregon, have invented certain new and useful Improvements in Valves; and I do hereby declare the following to be a full, clear, and exact description of the invention, such as will enable others skilled in the art to which it appertains to make and use the same.

My invention relates to valves for controlling the passage of fluids generally, including water, steam, gas or air, but is designed, arranged and adapted more particularly for use as a steam valve.

It has for an object the production of rotary disk valves which are at once extremely simple in construction, economical as to cost of production, and efficient in operation.

A further object is the production of valves wherein the packing ordinarily interposed between valves and valve seats is dispensed with.

A further object is the production of means for automatically forcing the valve into contact with its valve seat, at all times and particularly when closed.

Other objects and practical advantages of the structure shown and described will later appear.

The invention will be hereinafter particularly described, and set forth in the claims following.

In the accompanying drawings which form part of this application for Letters Patent, and whereon corresponding numerals refer to like parts in the several views:

Figure 1, is an end view of my invention with a portion of the valve case or union broken away exposing to view the within contained rotary disk valve and valve actuating appliances; Fig. 2 is a longitudinal vertical section through valve case and valve taken on the line 2—2 of Fig. 1, and Fig. 3, is an enlarged fragmentary detail view showing one adjustable roller bearing for maintaining close contact between the valve and its seat.

Reference being had to the drawings and numerals thereon, 1 indicates a valve case of substantially globular form cast of any suitable material in one piece, threaded as at 2 to receive a service discharge pipe, and provided with a transverse partition 3 constituting a valve seat. The seat 3 is circular in form and perforated at four or more equidistant points by sector shaped openings 4 which diverge outwardly from points near the center to near the outer edge of said seat.

Cast integrally with the valve case 1 is a cylindrical chamber 5 communicating directly with the interior of said case 1 throughout the major portion of its length as at 6, and screw threaded at its open end as at 7. The longitudinal axis of this chamber 5 is at right angles to that of the valve case 1, so that it is tangentially arranged with relation thereto.

Extending centrally into the chamber 5, is a hollow screw threaded plug 8 flanged as at 9 to limit its inward movement, and provided with a stuffing box 10, of ordinary construction, upon its outer end. Projecting into and through the said chamber 5 is a valve-stem 11 which finds bearings in the boring or central hollow opening of plug 8 aforesaid, and also in a pocket 12 provided at the inner end of said chamber 5. At its outer end the valve-stem 11 may be provided with a valve wheel, such as shown in dotted lines, or a lever of any description for turning said stem, while near its inner end it is surrounded by a short worm 13 for purposes which will later appear.

Fitted to the plane surface of valve seat 3 is a circular rotary disk-valve 14, connected centrally to its seat by a suitable through-bolt 15, as best shown by Fig. 2, and like said seat perforated by a corresponding series of equidistant ports 16, also sector shaped, and adapted when the valve is open to register accurately with openings 4 in said seat. The rotary valve 14 is provided throughout a given portion of its periphery with a segmental rack formed by radially projecting teeth 17, some of which are at all times in mesh with the worm 13 of valve-stem 11, by which gearing the valve may be readily rotated, upon bolt 15 as its center, in either direction until arrested by stop pins 18, 19, projecting from the valve-seat into the path of said segmental rack.

Projecting radially and in screw threaded relation, into the valve case 1 at equidistant points, are a series of four, more or less, screws or arbors 20 each provided with a jam nut 21 upon its outer end, and having an unthreaded inner end 22 eccentrically arranged with relation to the axis of the body of the screw. Upon the said eccentric unthreaded inner end of each screw threaded arbor 20 is journaled a roller 23 retained in place by a cotter pin 24 as best shown by Fig. 3 of the drawings. These rollers 23 bear normally upon the outer face of valve 14 to keep it securely seated at all times, and steam tight without the necessity of interposed packing; while as best shown by Fig. 1, there is arranged upon the outer face of said valve 14 a series of short inclines 25, in line with the rollers 23 midway between ports 16, by agency whereof the said rollers are caused to automatically exert increased pressure at times upon the valve, thereby keeping it more firmly seated when closed and when the pressure is greatest. And it will be noted that the eccentricity of said arbors or roller bearings permits an adjustment whereby the pressure of said rollers upon the valve 14 may be varied to meet varying requirements.

At its intake side case 1 is surrounded by a flange 26 to which are secured as by bolts 27 an annular union 28 threaded as at 29 to receive a supply pipe (not shown), and packed in the ordinary manner by a gasket 30 interposed between said union and the valve case.

This being a description of one embodiment of my invention its use and operation are quite obvious. When it is desired to open the valve more or less, rotation of stem 11 operates through worm 13 upon teeth 17 to rotate disk 14 in a counter clock-wise direction or toward stop 18 by which it is arrested as shown by Fig. 1, when ports 16 are wide open and in register with corresponding openings 4 of the valve seat. To partially or fully close the valve the operation is obviously just the reverse of that described, pin 19 in that event serving to check the rotation of disk 14 after ports 16 and 4 are fully closed; but, it will be noted that rollers 23 at all times bear upon the outer surface of said disk to assist the fluid pressure in keeping it firmly seated, and at the limit of the closing rotation these rollers automatically travel up inclines 25 to more securely retain the ports in closed relation and prevent leakage.

It might further be mentioned that the pressure of rollers 23 upon the surface of disk 14 may be adjusted to some extent by temporarily backing off lock nuts 21, and imparting to screws 20 a partial turn one way or the other before again setting up said nuts 21.

Having thus described my invention what I now claim and desire to secure by Letters Patent is:—

1. In a valve mechanism the combination with a valve case and ported valve seat, of a ported rotary valve, means for rotating said valve to bring said ports into register, and rollers interposed between the valve case and valve adapted to hold the latter in close contact with its seat.

2. In a valve mechanism the combination with a valve case and ported valve seat, of a ported rotary valve, means for rotating said valve to bring said ports into register, and rollers carried by the valve case bearing upon the surface of said valve adapted to hold the latter in close contact with its seat.

3. In a valve mechanism the combination with a valve case and ported valve seat, of a correspondingly ported rotary valve, means for rotating said valve to bring said ports into register, rollers interposed between the valve case and valve adapted to hold the latter in close contact with its seat, and means for adjusting the pressure of said rollers.

4. In a valve mechanism the combination with a valve case and ported valve seat, of a correspondingly ported rotary valve, means for rotating said valve to bring said ports into register, rollers interposed between said valve case and valve adapted to hold the latter in close contact with its seat, and an arbor for each roller projecting radially through the sides of the valve case.

5. In a valve mechanism the combination with a valve case and ported valve seat, of a correspondingly ported valve, means for rotating said valve to bring said ports into register, arbors projecting radially into said valve case, and rollers mounted eccentrically upon said arbors adapted to hold the valve in close contact with its seat.

6. In a valve mechanism the combination with a valve case and ported valve seat, of a correspondingly ported rotary disk valve, means for rotating said valve to bring said ports into register, rollers interposed between the valve case and valve adapted to hold the latter in close contact with its seat, and inclines upon the outer surface of the valve in the path of said rollers.

7. In a valve mechanism the combination with a valve case and ported valve seat, of a correspondingly ported rotary disk valve provided with a segmental rack, a valve stem having a worm engaging said rack to rotate the valve whereby said ports may be brought into register, rollers interposed between the valve case and valve adapted to hold the latter in close contact with its seat, means for adjusting the pressure of said rollers, and inclines upon said rotary valve in the path of said rollers by which they are engaged when the valve is closed.

In testimony whereof I affix my signature, in presence of two subscribing witnesses.

WILLIAM E. MERRITT.

Witnesses:
A. RAY AUSTIN,
LATTIN W. MERRITT.